United States Patent
Knudson et al.

(10) Patent No.: US 11,593,569 B2
(45) Date of Patent: Feb. 28, 2023

(54) ENHANCED INPUT FOR TEXT ANALYTICS

(71) Applicant: Lenovo (Singapore) Pte. Ltd., Singapore (SG)

(72) Inventors: Ryan Knudson, Durham, NC (US); Russell VanBlon, Raleigh, NC (US); Roderick Echols, Durham, NC (US); Bradley Park Strazisar, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/600,203

(22) Filed: Oct. 11, 2019

(65) Prior Publication Data

US 2021/0110119 A1   Apr. 15, 2021

(51) Int. Cl.
| | |
|---|---|
| *G06F 40/10* | (2020.01) |
| *G06F 40/56* | (2020.01) |
| *G06F 40/35* | (2020.01) |
| *G06N 20/00* | (2019.01) |

(52) U.S. Cl.
CPC .............. *G06F 40/56* (2020.01); *G06F 40/35* (2020.01); *G06N 20/00* (2019.01)

(58) Field of Classification Search
CPC ...... G06F 40/30; G06F 40/205; G06F 40/284; G06F 16/244; G06F 16/951; G06N 20/00; G06N 3/08
See application file for complete search history.

(56) References Cited

U.S. PATENT DOCUMENTS

| | | | | |
|---|---|---|---|---|
| 8,150,676 | B1* | 4/2012 | Kaeser | G06F 40/56 |
| | | | | 715/260 |
| 9,465,789 | B1* | 10/2016 | Chen | G06F 40/126 |
| 10,891,420 | B1* | 1/2021 | Kirby | G06F 40/194 |
| 2006/0184500 | A1* | 8/2006 | Najork | G06F 16/951 |
| 2007/0011323 | A1* | 1/2007 | Gaal | G06Q 10/107 |
| | | | | 709/225 |
| 2008/0103996 | A1* | 5/2008 | Forman | G06N 20/00 |
| | | | | 706/12 |
| 2015/0112753 | A1* | 4/2015 | Suvarna | G06N 20/10 |
| | | | | 705/7.29 |
| 2015/0195224 | A1* | 7/2015 | Karnin | H04L 51/046 |
| | | | | 706/12 |
| 2016/0110657 | A1* | 4/2016 | Gibiansky | G06N 20/00 |
| | | | | 706/12 |
| 2016/0191472 | A1* | 6/2016 | Ghafourifar | H04L 9/088 |
| | | | | 713/167 |
| 2017/0116332 | A1* | 4/2017 | Andrade Silva | G06N 20/00 |
| 2017/0222960 | A1* | 8/2017 | Agarwal | G06Q 10/107 |
| 2017/0295119 | A1* | 10/2017 | Rosenberg | G06Q 30/0643 |

(Continued)

OTHER PUBLICATIONS

Lundberg et al, "Towards a language independent Twitter bot detector", Mar. 5, 2019, InDHN 2019, pp. 308-319.*

(Continued)

*Primary Examiner* — Olujimi A Adesanya
(74) *Attorney, Agent, or Firm* — Schwegman Lundberg & Woessner, P.A.

(57) ABSTRACT

A computer implemented method includes receiving text data, detecting auto-generated text in the received text data to identify tags in the received text to distinguish between the auto-generated text and user generated text, and providing the tagged text data to a machine learning language model.

17 Claims, 4 Drawing Sheets

(56) References Cited

U.S. PATENT DOCUMENTS

| | | | | |
|---|---|---|---|---|
| 2017/0310616 A1* | 10/2017 | Cao | ............... | H04L 51/046 |
| 2018/0217980 A1* | 8/2018 | Baron-Palucka | ....... | H04L 67/42 |
| 2019/0014148 A1* | 1/2019 | Foster | ............ | G06N 3/0445 |
| 2019/0034807 A1* | 1/2019 | Clark | ............... | G06F 16/35 |
| 2020/0026755 A1* | 1/2020 | Hewitt | ............ | G06F 40/30 |
| 2020/0110802 A1* | 4/2020 | Echihabi | ......... | G06F 3/0484 |
| 2020/0142999 A1* | 5/2020 | Pedersen | ......... | G06K 9/6218 |
| 2020/0344194 A1* | 10/2020 | Hosseinisianaki | ..... | G06Q 10/10 |
| 2021/0012102 A1* | 1/2021 | Cristescu | ......... | G06F 40/284 |

OTHER PUBLICATIONS

Aggarwal et al, "PhishAri: Automatic realtime phishing detection on twitter", 2012, In2012 eCrime Researchers Summit Oct. 23, 2012 (pp. 1-12). IEEE.*

Laboreiro et al, "Identifying automatic posting systems in microblogs", 2011, InPortuguese Conference on Artificial Intelligence Oct. 10, 2011 (pp. 634-648). Springer, Berlin, Heidelberg.*

Lundberg et al, "On-the-fly detection of autogenerated tweets", Apr. 2018, arXiv preprint arXiv:1802.01197. Feb. 4, 2018, pp. 1-17.*

\* cited by examiner

200

<AUTO> CONGRATULATIONS ON YOUR
RECENT ANNIVERSARY./<AUTO>

<USER> HOPE YOU HAD A GREAT TIME
AT THE PARTY LAST NIGHT!/<USER>

<AUTO> HAPPY BIRTHDAY?/<AUTO>

LET'S GET TOGETHER AGAIN AND GO
FISHING SOON.

410
HAPPY BIRTHDAY!<USER> REALLY
420— NICE TO SEE YOU AT THE REUNION.
I REMEMBER... TIL NEXT TIME.
/<USER> HAPPY ANNIVERSARY!
415

FIG. 4

ENHANCED INPUT FOR TEXT ANALYTICS

BACKGROUND

Language models may be used in machine learning for a variety of different purposes. Various language models may be used in speech recognition, optical character recognition and other applications. Some language models may be used to help determine a user's sentiment and even to identify an author of text. However, the language model is dependent on the text used to train the model. Poor training data is contributing factor to language model quality problems, resulting in deficient predictions.

SUMMARY

A computer implemented method includes receiving text data, detecting auto-generated text in the received text data to identify tags in the received text to distinguish between the auto-generated text and user generated text, and providing the tagged text data to a machine learning language model.

BRIEF DESCRIPTION OF THE DRAWINGS

FIG. 2 is a data structure representation of example text wherein auto-generated text is tagged according to an example embodiment.

FIG. 3 is a data structure representation of example text wherein only auto-generated text is tagged according to an example embodiment.

FIG. 4 is a data structure representation of example text wherein only user generated text is tagged according to an example embodiment.

DETAILED DESCRIPTION

Figure 1:
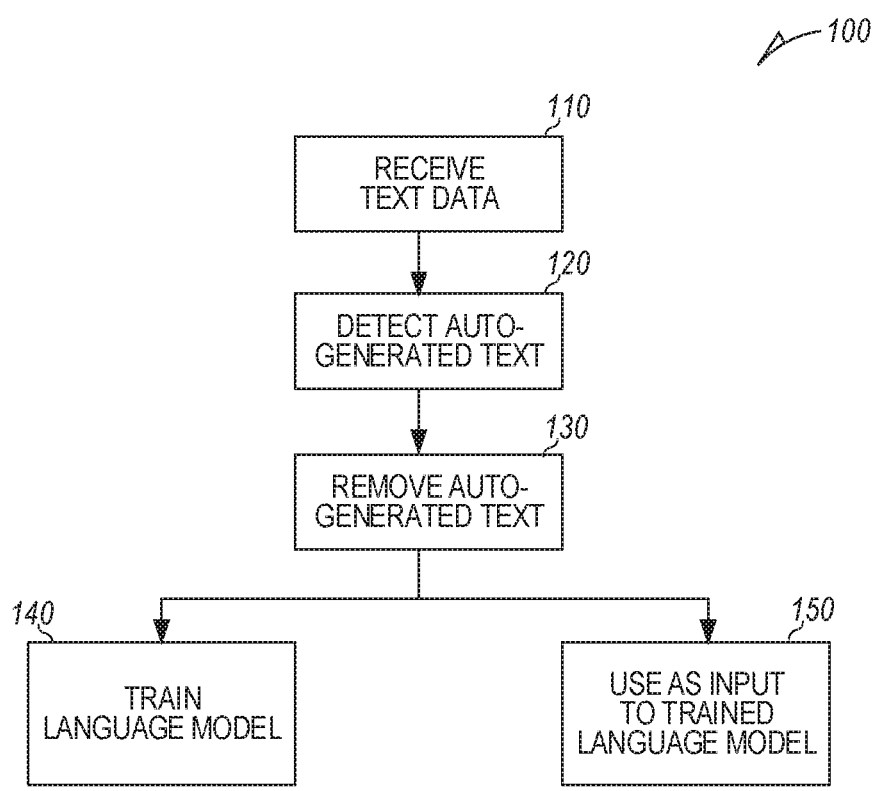
FIG. 1 is a flowchart illustrating a method of creating training data for language models according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Big data analytics may include the use of language models. A statistical language model is a probability distribution over sequences of words. Given such a sequence, say of length m, the language model assigns a probability to the whole sequence. In some language models, an assumption is made that the probability of a word only depends on the previous n words. This is known as an n-gram model or unigram model when n=1. The unigram model is also known as the bag of words model.

Estimating the relative likelihood of different phrases is useful in many natural language processing applications, especially those that generate text as an output. Language modeling is used in speech recognition, machine translation, part-of-speech tagging, parsing, optical character recognition, handwriting recognition, information retrieval, sentiment analysis, auto gender identification, author identification, spam detection, and other applications.

Language models may also be generated based on language used by a particular user or users creating text in different contexts such as online forums. Such language models when trained on language used by an individual user can be used to predict the next word a user is likely to use and is also useful for at least sentiment analysis and author identification. However, the context in which a user is writing may also include automatically generated text created by various application programs, which may not be representative of what the user would have input.

Auto-generated text is increasingly appearing in online forums. The auto-generated text adversely affects language models (LM) derived from such forums. On a social media service, such as LinkedIn, an example of auto-generated text is found in the context of a user being notified that: "friend X has a 5-year anniversary at his/her job" followed by a button to: "congratulate him/her." When the button is selected, an auto-generated text string is produced, something to the effect of a string stating: "Congratulations on your recent anniversary." This string is not reflective of the user and the user's communication. Including it in a language model skews the language model away from a true communications language model.

Various embodiments described herein discard autogenerated text strings from language model training data resulting in a more accurate language model that can provide better analyses for given input data. The more accurate language model may be especially helpful in scenarios in which the user adds additional text to the auto-generated text, e.g., "I'm so happy for you!", "That's awesome!", "So proud of you!", "So proud!", etc. Metadata for the text may be used to tag data as <real> data or <generated> data. In one embodiment, tagging either user generated text, or auto-generated text may be performed to reduce the amount of data. In one embodiment, a segment of text resulting from user interactions is tagged with either only <real> or <generated>, whichever would result in less tags for the segment. Thus different segments may be tagged differently. Such segments may also include an indication of which type of tagging is associated with each different segment. This type of different segment tagging may be more efficient for longer segments of text.

In other words, if only one piece or segment of data in a large set is auto-generated, then one or a few pieces of data may be tagged as <auto> and none of the human-generated data is tagged. If only one piece of data in a large set is human-generated, then the one piece is tagged as <human> and none of the auto-generated data is tagged, resulting in a much smaller document being sent for creation of the language model or analysis by the already created language model. The type of tagging may be related to the relative number of occurrences of each type of text, with the least frequently occurring generated text being marked or tagged. Reducing the size of the data, such as a document, can reduce the processing resources needed to process the document. The removal of the auto generated text from training data for model creation can result in a creation of better language models and more accurate results in the use of the language model in response to input that may also have such auto generated text tagged or removed based on the tags prior to being input to the model.

W3C is an international community of member organizations that articulates web standards so that websites look and work the same in all web browsers. A W3C standard may also be crafted to specify a method of identifying real or generated text enabling any online entity, e.g., Facebook, blog posts, Twitter, etc., to mark auto-generated text as such. The use of such a standard would result in a smaller-sized document would be preferred. Any tag-based language may be used to make such an identification. The terms used above, <real> data or <generated>, may be varied in the delineators used and/or the characters between the delineators. Alternative methods include the use of a header with offsets into a data payload identifying user and/or auto-generated text. Such identifications may be used for data used to train the models as well as for input to already trained models.

The elimination of auto generated text from language model training data facilitates creation of language models that are truer to their form than current solutions allow. Such elimination will make natural language processing (NLP) tasks cleaner and more accurate, e.g., sentiment analysis, auto gender identification, author identification, spam detection, etc., etc. The removal of auto-generated text may be done by N-gram level text classification. The N-grams may be of any size but will likely be of "sentence" size. Concerning online data, metadata could be included for all auto-generated text. This would enable the data to be marked as auto-generated before language-modeling happened.

FIG. 1 is a flowchart illustrating a method 100 of creating training data for language models. Method 100 begins by receiving text data containing user generated text and auto-generated text at operation 110. The received text data comprises identifiers for use in detecting the auto-generated text in the received text data. The identifiers comprise metadata which may include tags associated with the auto-generated text. The tags may alternatively, or in addition be associated with the user generated text. The tags may character delineated text of a markup language. The received text data may include auto-generated text generated by a social media service in response to user selection of the auto-generated text. In further embodiments, the text may be obtained from user posts in a forum, emails written the by users, or even articles and books written by users.

In one embodiment, the tags are associated with the auto-generated text in response to the received text data containing more user generated text than auto-generated text or the tags are associated with the user generated text in response to the received text data containing more auto-generated text than user generated text.

The auto-generated text is detected, at operation 120, in the received text data. At operation 130, the detected auto-generated text is removed from the received text data to create selected user generated text data. The selected user generated text data is provided to a machine learning language model for use in training the model at operation 140, or as input to an already trained model at operation 150. In various embodiments, operation 130 may be included in the text data provided to the language model for training or use, with the language model optionally performing the operation of removing the auto-generated text or using the auto-generated text in the training or running of the model. The tagged text data provided to the machine learning language model may include the tags or may simply not including data identified by the tags, such as the auto-generated text. The auto-generated text can be removed either before tagged text data is provided to the model or may be removed by the model itself. The model can take the auto-generated data into account or not during training or during use of the model. When taken into account, the auto-generated text may be viewed as influencing the user generated text and may increase the model accuracy.

FIG. 2 is a data structure representation of example text 200 wherein auto-generated text is tagged with <auto> text . . . /<auto> and user generated text is tagged with <user> text . . . /<user>. The backslash is used to signify the end of the text. In some embodiment, the second tag for each type of text is not needed, as the next tag signifying the beginning of user or auto generated text signifies the end of the preceding designation.

FIG. 3 is a data structure representation of example text 300 wherein only auto-generated text is tagged.

FIG. 4 is a data structure representation of example text 400 wherein only user generated text is tagged. Text 400 is also representative of the use of frequency of occurrence to determine which type of text to tag. Note that there are two instances of auto-generated text as indicated at 410 and 415, with only one instance of user generated text that is tagged at 420.

Neural networks may be used to create language models in one embodiment. Neural language models (or continuous space language models) use continuous representations or embeddings of words to make their predictions.

Artificial intelligence (AI) is a field concerned with developing decision-making systems to perform cognitive tasks that have traditionally required a living actor, such as a person. Artificial neural networks (ANNs) are computational structures that are loosely modeled on biological neurons. Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, language processing, contextual awareness, etc.), automated cognition (e.g., decision-making, logistics, routing, supply chain optimization, etc.), automated control (e.g., autonomous cars, drones, robots, etc.), among others.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most ANNs relies on correct weights. However, ANN designers do not generally know which weights will work for a given application. Instead, a training process is used to arrive at appropriate weights. ANN designers typically choose a number of neuron layers or specific connections between layers including circular connection, but the ANN designer does not generally know which weights will work for a given application. Instead, a training process generally proceeds by selecting initial weights, which may be randomly selected. Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs.

Figure 5:
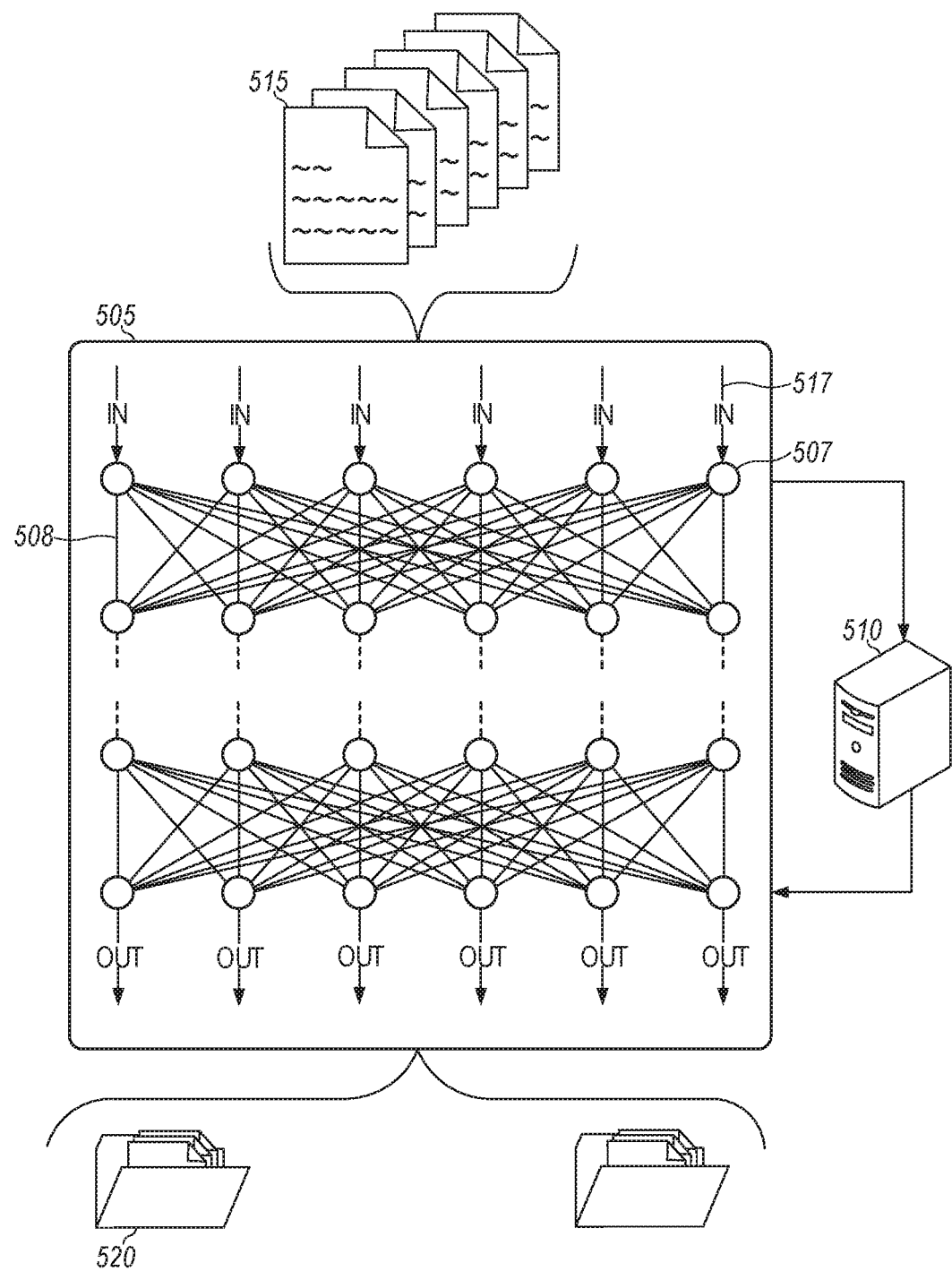
FIG. 5 is a block diagram of an example of an environment including a system for neural network training according to an example embodiment.

FIG. 5 is a block diagram of an example of an environment including a system for neural network training, according to an embodiment. The system includes an ANN 505 that is trained using a processing node 510. The processing node 510 may be a CPU, GPU, field programmable gate array (FPGA), digital signal processor (DSP), application specific integrated circuit (ASIC), or other processing circuitry. In an example, multiple processing nodes may be employed to train different layers of the ANN 505, or even different nodes 507 within layers. Thus, a set of processing nodes 510 is arranged to perform the training of the ANN 505.

The set of processing nodes 510 is arranged to receive a training set 515 for the ANN 505. The training sent may be the user generated text with auto-generated text removed in various embodiments. The ANN 505 comprises a set of nodes 507 arranged in layers (illustrated as rows of nodes 507) and a set of inter-node weights 508 (e.g., parameters) between nodes in the set of nodes. In an example, the training set 515 is a subset of a complete training set. Here, the subset may enable processing nodes with limited storage resources to participate in training the ANN 505.

The training data may include multiple numerical values representative of a domain, such as red, green, and blue pixel values and intensity values for an image or pitch and volume values at discrete times for speech recognition. Each value of the training or input 517 to be classified once ANN 505 is trained, is provided to a corresponding node 507 in the first layer or input layer of ANN 505. The values propagate through the layers and are changed by the objective function.

As noted above, the set of processing nodes is arranged to train the neural network to create a trained neural network. Once trained, data input into the ANN will produce valid classifications 520 (e.g., the input data 517 will be assigned into categories), for example. The training performed by the set of processing nodes 507 is iterative. In an example, each iteration of the training the neural network is performed independently between layers of the ANN 505. Thus, two distinct layers may be processed in parallel by different members of the set of processing nodes. In an example, different layers of the ANN 505 are trained on different hardware. The members of different members of the set of processing nodes may be located in different packages, housings, computers, cloud based resources, etc. In an example, each iteration of the training is performed independently between nodes in the set of nodes. This example is an additional parallelization whereby individual nodes 507 (e.g., neurons) are trained independently. In an example, the nodes are trained on different hardware.

Figure 6:
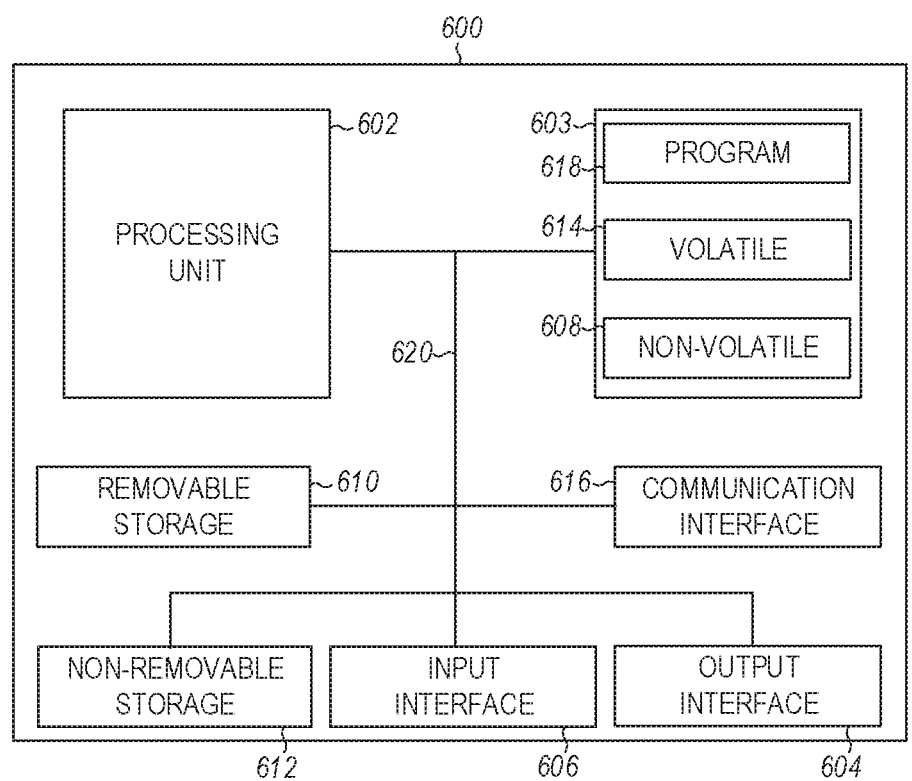
FIG. 6 is a block schematic diagram of a computer system to implement one or more example embodiments.

FIG. 6 is a block schematic diagram of a computer system 600 to implement and perform methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods of generated and using language models based on user generated text. A hard drive. CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 618 along with the workspace manager 622 may be used to cause processing unit 602 to perform one or more methods or algorithms described herein.

Examples

1. A computer implemented method includes receiving text data, detecting auto-generated text in the received text data to identify tags in the received text to distinguish between the auto-generated text and user generated text, and providing the tagged text data to a machine learning language model.

2. The method of example 1 wherein providing the tagged text data comprises removing auto-generated text from the tagged text data provided to the machine learning language model.

3. The method of any of examples 1-2 wherein providing the tagged text data comprises including auto-generated text from the tagged text data provided to the machine learning language model he identifiers comprise metadata.

4. The method of example 3 wherein the tagged text data comprises tagged auto-generated text.

5. The method of any of examples 1-4 wherein the tags comprise character delineated text of a markup language.

6. The method of any of examples 1-5 wherein the metadata comprises tags associated with the user generated text.

7. The method of any of examples 1-4 wherein the tags are associated with the auto-generated text in response to the received text data containing more user generated text than auto-generated text or wherein the tags associated with the user generated text in response to the received text data containing more auto-generated text than user generated text.

8. The method of any of examples 1-7 and further comprising training the machine learning model with the user generated text data.

9. The method of any of examples 1-8 and further comprising providing the tagged text data as input to the machine learning language model that has already been trained.

10. The method of any of examples 1-9 wherein the received text data includes auto-generated text generated by a social media service in response to user selection of the auto-generated text.

11. A machine-readable storage device having instructions for execution by a processor of a machine to cause the processor to perform operations to perform a method, the operations comprising:

11. A machine-readable storage device has instructions for execution by a processor of a machine to cause the processor to perform operations to perform a method. The operations include receiving text data, detecting auto-generated text in the received text data to identify tags in the received text to distinguish between the auto-generated text and user generated text, and providing the tagged text data to a machine learning language model.

12. The device of example 11 wherein providing the tagged text data comprises removing auto-generated text from the tagged text data provided to the machine learning language model.

13. The device of any of examples 11-12 wherein providing the tagged text data comprises including auto-generated text from the tagged text data provided to the machine learning language model he identifiers comprise metadata.

14. The device of any of examples 13 wherein the tagged text data comprises tagged auto-generated text.

15. The device of any of examples 11-14 wherein the tags comprise character delineated text of a markup language.

16. The device of any of examples 11-15 wherein the metadata comprises tags associated with the user generated text.

17. The device of any of examples 11-6 wherein the tags are associated with the auto-generated text in response to the received text data containing more user generated text than auto-generated text or wherein the tags associated with the user generated text in response to the received text data containing more auto-generated text than user generated text.

18. A device includes a processor and a memory device coupled to the processor and having a program stored thereon for execution by the processor to perform operations. The operations include receiving text data, detecting auto-generated text in the received text data to identify tags in the received text to distinguish between the auto-generated text and user generated text, and providing the tagged text data to a machine learning language model.

19. The device of example 18 wherein providing the tagged text data comprises removing auto-generated text from the tagged text data provided to the machine learning language model.

20. The device of any of examples 18-19 wherein the tags are associated with the auto-generated text in response to the received text data containing more user generated text than auto-generated text or wherein the tags associated with the user generated text in response to the received text data containing more auto-generated text than user generated text.

21. A computer implemented method includes receiving text data containing user generated text and auto-generated text, detecting the auto-generated text in the received text data, removing the detected auto-generated text in the received text data to select user generated text data, and providing the selected user generated text data to a machine learning language model.

22. A computer implemented method includes receiving text data, detecting auto-generated text in the received text data, tagging the received text to distinguish between the auto-generated text and user generated text, and providing the tagged text data to a machine learning language model.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
receiving a data set containing text generated by a user and auto-generated text data selected by the user, the received text data including a tag distinguishing between the text generated by the user and auto generated text selected by the user in the data set;
detecting auto-generated text selected by the user based on the tag;
removing the auto-generated text from the data set to generate a training data set;
providing the training data set to a machine learning language model; and
training the machine learning language model with the training data set, using backpropagation by applying an objective function to correct synapse weights to generate a user particular language model.

2. The method of claim 1 wherein the auto-generated text is removed from the data set based on the tag.

3. The method of claim 1 wherein the tag comprises metadata associated with the auto-generated text.

4. The method of claim 1 wherein the tag comprises character delineated text of a markup language.

5. The method of claim 1 wherein the tag comprises metadata associated with the user generated text.

6. The method of claim 1 wherein the tag comprises multiple tags, each tag being associated with the auto-generated text in response to the received data set containing more text generated by the user than auto-generated text or wherein the tags are associated with the user generated text in response to the received text data containing more auto-generated text than text generated by the user.

7. The method of claim 1 wherein generating the user particular language model comprises training the machine learning language model with the user generated text data.

8. The method of claim 1 and further comprising providing the user generated text data remaining in the received data set as input to the machine learning language model that has already been trained.

9. The method of claim 1 wherein the received data set includes auto-generated text generated by a social media service in response to user selection of the auto-generated text.

10. A machine-readable storage device having instructions for execution by a processor of a machine to cause the processor to perform operations to perform a method, the operations comprising:
receiving a data set containing text generated by a user and auto-generated text data selected by the user, the received text data including a tag distinguishing between the text generated by the user and auto generated text selected by the user in the data set;
detecting auto-generated text selected by the user based on the tag;
removing the auto-generated text from the data set to generate a training data set;
providing the training data set to a machine learning language model; and
training the machine learning language model with the training data set, using backpropagation by applying an objective function to correct synapse weights to generate a user particular language model.

11. The device of claim 10 wherein the auto-generated text is removed from the data set based on the tag.

12. The device of claim 11 wherein the tag comprises metadata associated with the auto-generated text.

13. The device of claim 10 wherein the tag comprises character delineated text of a markup language.

14. The device of claim 10 wherein the tag comprises metadata associated with the user generated text.

15. The device of claim 10 wherein the tag comprises multiple tags, each tag being associated with the autogenerated text in response to the received data set containing more text generated by the user than auto-generated text or wherein the tags are associated with the user generated text in response to the received text data containing more auto-generated text than text generated by the user.

16. A device comprising:
a processor; and
a memory device coupled to the processor and having a program stored thereon for execution by the processor to perform operations comprising:
receiving a data set containing text generated by a user and auto-generated text data selected by the user, the received text data including a tag distinguishing between the text generated by the user and auto generated text selected by the user in the data set;
detecting auto-generated text selected by the user based on the tag;
removing the auto-generated text from the data set to generate a training data set;
providing the training data set to a machine learning language model; and
training the machine learning language model with the training data set, using backpropagation by applying an objective function to correct synapse weights to generate a user particular language model.

17. The device of claim 16 wherein the tag comprises multiple tags, each tag being associated with the auto-generated text in response to the received data set containing more text generated by the user than auto-generated text or wherein the tags are associated with the user generated text in response to the received text data containing more auto-generated text than text generated by the user.

* * * * *